July 8, 1969  W. A. ROMANAUSKAS  3,453,847
SHEET GUIDING AND TENSIONING DEVICE
Filed Feb. 18, 1966  Sheet 8 of 10

INVENTOR
WILLIAM A. ROMANAUSKAS
BY
ATTORNEY

United States Patent Office 3,453,847
Patented July 8, 1969

3,453,847
SHEET GUIDING AND TENSIONING DEVICE
William A. Romanauskas, Waterbury, Conn., assignor to Chase Brass & Copper Co., Inc., Waterbury, Conn., a corporation of Connecticut
Filed Feb. 18, 1966, Ser. No. 528,589
Int. Cl. B21b 37/00, 39/08, 39/20
U.S. Cl. 72—10                               8 Claims

ABSTRACT OF THE DISCLOSURE

This disclosure relates to apparatus for the automatic control of tension and lateral movement of moving sheets of continuous or indefinite lengths utilizing a movable roll unit to contact the sheet surface to apply tension to said sheet and a tracking means to simultaneously control the lateral movement of said sheet.

---

This invention relates to the control of sheets of continuous or indefinite lengths during their travel through a treatment operation and has for its object the provision of an improved apparatus for continuously guiding and tensioning delicate sheets lacking strength and toughness without damaging or deforming the sheet.

In the production, treatment, coating and other operations performed on continuously moving sheets in industrial operation, the control of the lateral position of the sheet and proper tensioning of the sheet are essential to the production of an acceptable product. In particular, in operations for rolling metallic sheets, it is essential that the lateral position of the sheet be controlled within narrow ranges to assure that the sheet enters the rolls of rolling units at the proper position in order to produce a sheet of proper thickness. It is known, for example, that where rolls having crowned or curved surfaces are used, alignment of the entering sheet is very important in the attainment of sheet thickness within close tolerances.

Although it has been proposed heretofore to guide and tension a continuously moving sheet using apparatus for detecting movement of the sheet and having guide means responsive to these detection means for correcting variations in sheet movement, such apparatus has been found to be unsatisfactory in controlling, guiding and handling moving sheets which lack toughness and strength. For example, in the production of sheet metal from sintered powdered metals such as copper the strength and toughness of the sintered sheet before it is finally rolled does not permit the use of conventional sheet control techniques.

In accordance with the present invention the continuously moving sheet is guided and tensioned by a movable dancer roll. The dancer roll is mounted on a movable unit which permits the roll to be moved away from the sheet to tension the sheet and also permits the dancer roll to be tilted to cause the sheet to move laterally in response to a sheet tracking unit which senses the sheet position. Tension in the sheet may also be adjusted by controlling the tensioning force exerted by the dancer roll and by varying the speed of the moving sheet.

More particularly, the apparatus of the invention comprises means for guiding and tensioning a continuously moving sheet of material including a unit adapted for guided movement toward and away from the moving sheet, elements for guiding said unit as it moves toward and away from the moving sheet and a tiltable dancer roll mounted on the unit for operable positioning in engagement with a surface of the moving sheet to guide and tension the sheet. The apparatus comprises a tracking system including a sensor uint and a sensor control unit for tracking the moving sheet and means on the movable unit responsive to the sensor control unit for tilting the dancer roll. Thus, movement of the dancer roll controls both the lateral movement and tension of the moving sheet. Tension in the sheet may be adjusted by counterweighting the movable unit.

The accompanying drawings illustrate an embodiment of the invention advantageous in guiding and tensioning delicate sheet material in which:

FIG. 8(a), (b) and (c) is a side elevation view of the dancer roll and moving sheet in various positions;

For convenience the invention will be described with respect to a delicate sheet of metal formed from powdered metal, for example, powdered copper as produced in the process of the application of Roger G. Sweet, Ser. No. 363,086, filed Apr. 28, 1964 and now Patent No. 3,330,654.

Figure 1:
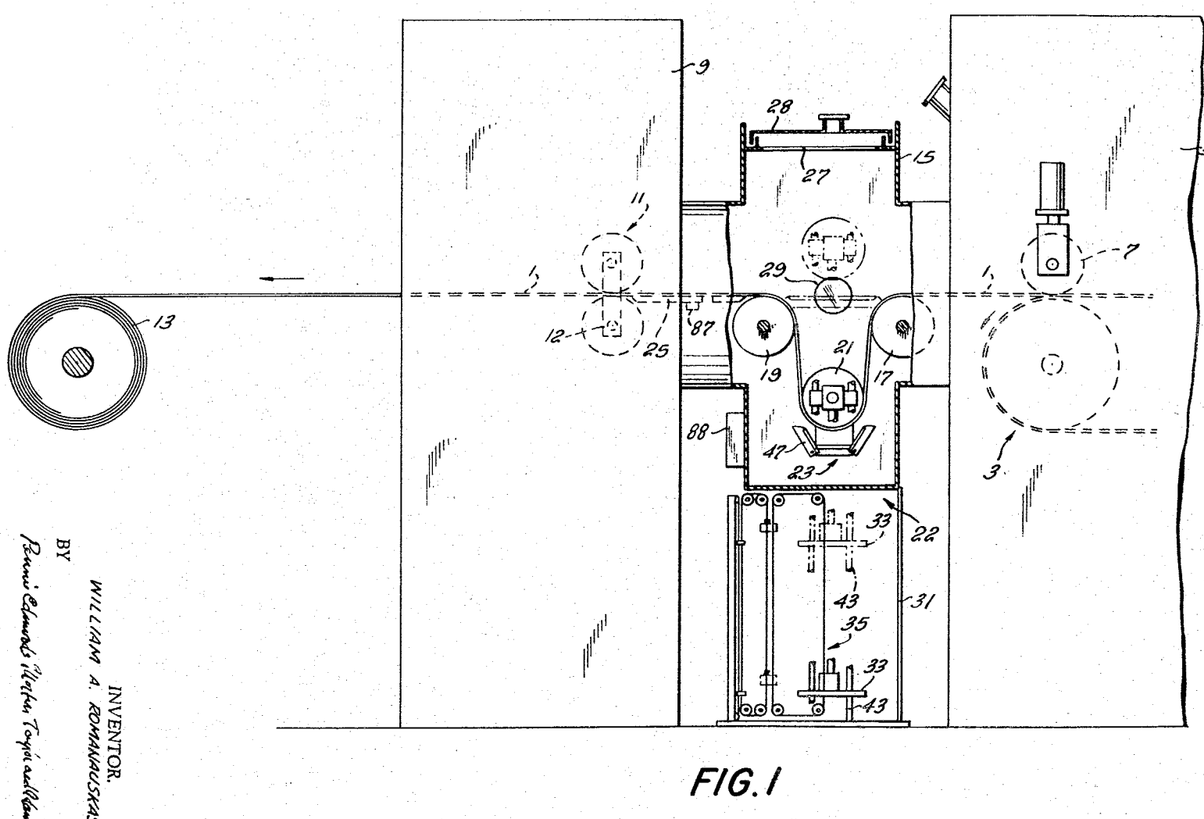
FIG. 1 is an elevation view, partly in section, of the apparatus positioned within and between a sintering furnace and a mill unit.

As illustrated in FIG. 1 the delicate sintered powder metal sheet or strip 1 is carried by the endless belt conveyor 3 in sintering furnace 5. The sheet 1 is held in a nip formed by pinch roll 7 and conveyor 3 within furnace 5 and, thereafter, it is rolled in the mill unit 9 by rollers 11 which are driven by a variable drive unit 12. The nip formed by pinch roll 7 and conveyor 3, in addition to providing some consolidation of the copper powder in the sintered sheet, functions to isolate between the nip and the mill unit the sheet tension developed by the dancer roll. The pinch roll also assists in initially threading the sheet when the process and apparatus are started up. After the final rolling operation the finished sheet is wound on to take-up roll 13. Enclosure 15, furnace 5 and mill unit 9 have an inert atmosphere communicating with one another to prevent oxidation of the sheet during its movement and formation. Below enclosure 15 is a housing 31 having normal atmospheric conditions therein.

Within enclosure 15 are first turn roll 17, second turn roll 19 and dancer roll 21. Portions of movable unit 22 including dancer roll 21 and platform 33 are shown in FIG. 1. Also shown are portions of stationary guide rod 43 which guide movable unit 22 in its reciprocating vertical movement. The movable unit is shown both in its normal operating position below the turn rolls and (in dashed lines) in its starting position where the foldable bridge 23 depending from the dancer roll assists threading of the sintered sheet. When the apparatus is started up the leading end of the sintered sheet 1 is fed through pinch roll 7, over first turn roll 17 and onto foldable bridge 23 which carries the strip onto and over second turn roll 19 where the strip is supported by support plate 25 until it reaches rollers 11. Also shown is upper access hatch 27, hatch cover 28 and sight port 29.

Within housing 31 is platform 33 and an elevator and counterbalancing arrangement 35 for raising and lowering the movable unit 22 to start the apparatus and to apply tension to the sintered strip 1 during operation of the apparatus.

Figure 2:
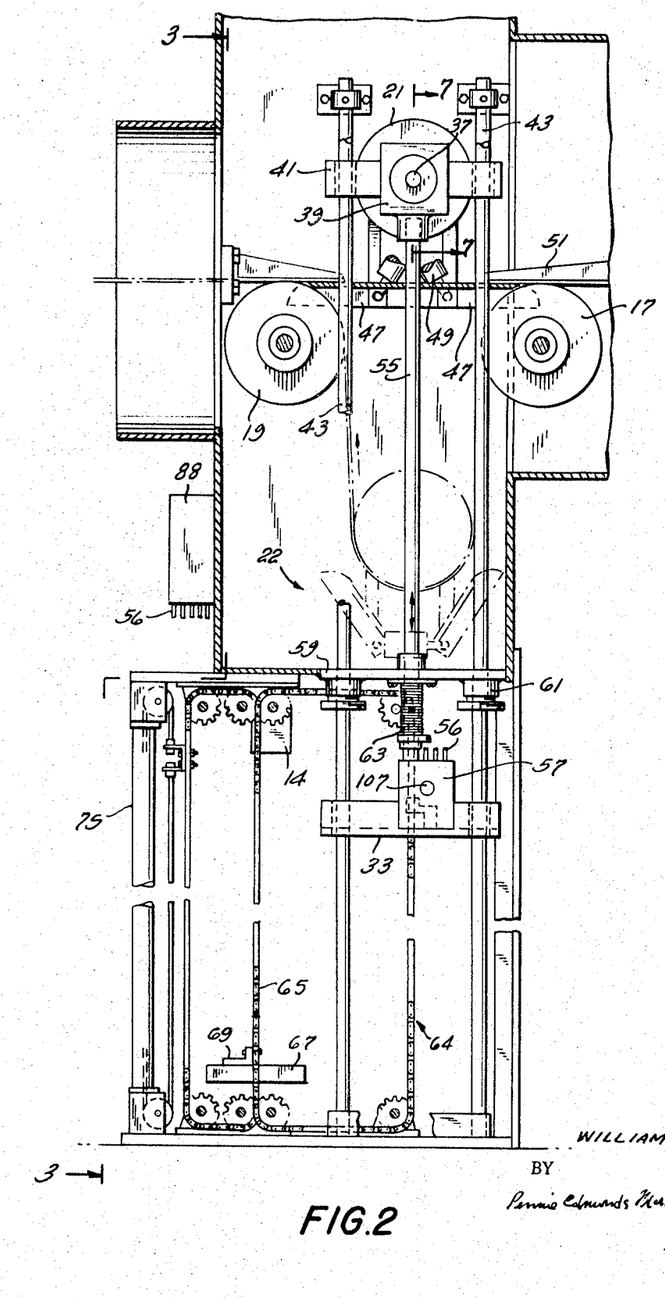
FIG. 2 is an enlarged sectional elevation view of the apparatus of FIG. 1 showing the dancer roll in its starting and running positions.
Figure 3:
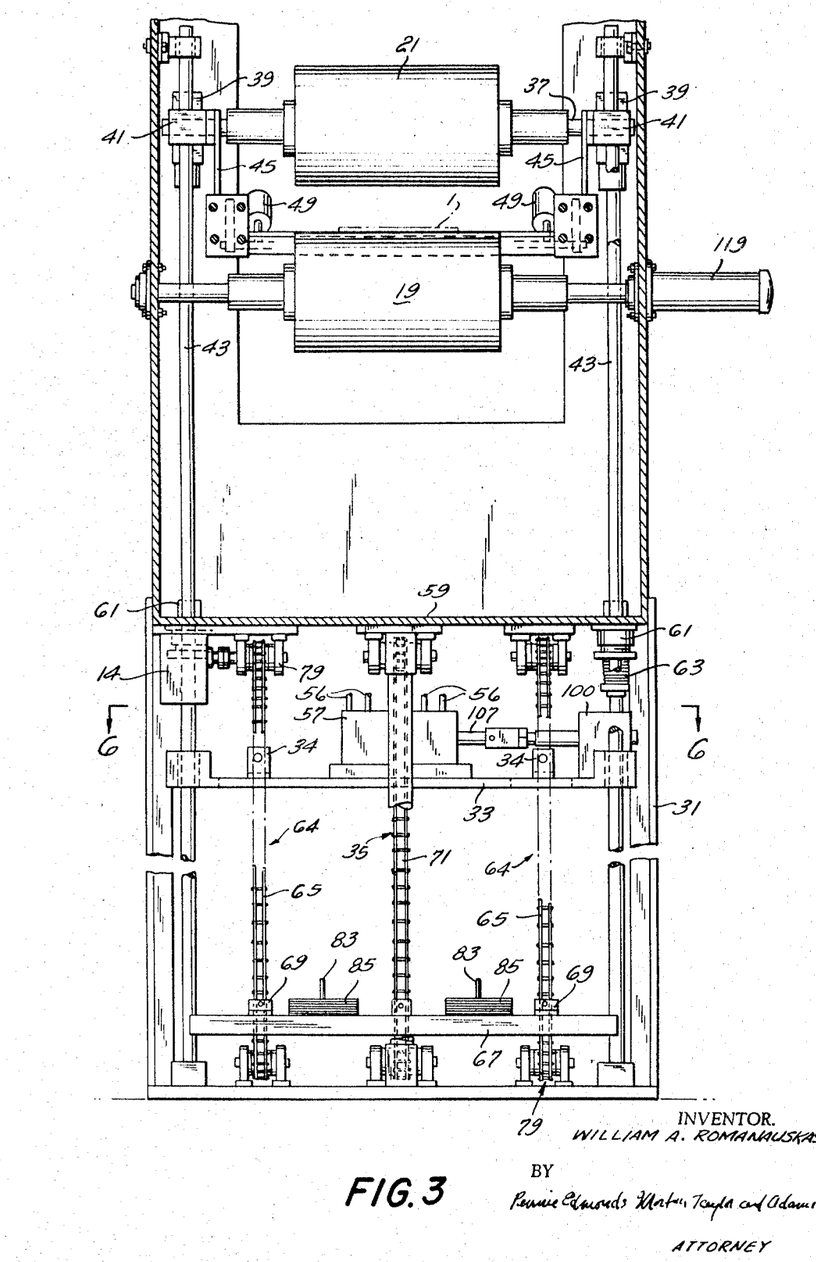
FIG. 3 is a sectional view at 3—3 of FIG. 2.
Figure 4:
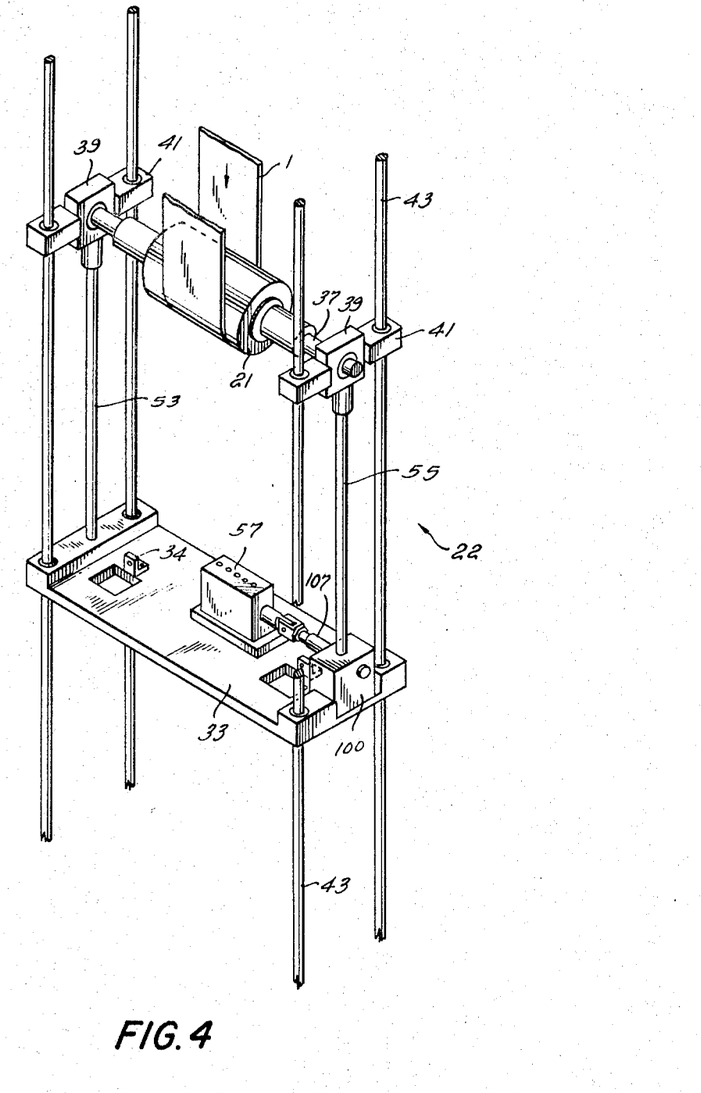
FIG. 4 is a perspective view showing a portion of the movable unit including the dancer roll and the platform from which it is supported and controlled.

Directing attention to FIGS. 2, 3 and 4, it is seen that movable unit 22 includes platform 33, spacing rod 53, control rod 55 and associated bearings and is mounted on stationary guide rods 43 for reciprocating movement toward and away from sheet 1. Dancer roll 21 is mounted on shaft 37 which is in turn mounted in dancer roll bearing units 39. Each bearing unit 39 is secured to and positioned between vertical sleeve bearings 41 which are mounted for sliding engagement with stationary guide rods 43. Depending from sleeve bearings 41 are brackets 45 which carry sections 47 of foldable bridge 23. Each section is counterweighted with weights 49 in such a manner that the raising of the movable unit causes bridge sections 47 to engage stops 51 thus turning the sections to align with one another to form a horizontal bridge between turn rolls 17 and 19. When the dancer roll is thereafter lowered, the bridge sections turn to their folded positions so that they clear the turn rolls as they descend. The dancer roll 21 of movable unit 22 engages sheet 1 in its lowered position (FIG. 4).

The position of the dancer roll is controlled by platform 33, spacing rod 53, control rod 55 and control unit 57. Portions of flexible gas hoses 56 are shown connecting sensor control unit 88 and control unit 57 to provide gas flow between these units to selectively operate piston 107. Platform 33 is at all times positioned below enclosure 15 and rods 43, 53 and 55 are positioned through bottom plate 59 of enclosure 15 using stuffing boxes 61 and flexible boots 63 to prevent substantial communication between the atmospheres within and without the enclosure.

Figure 5:
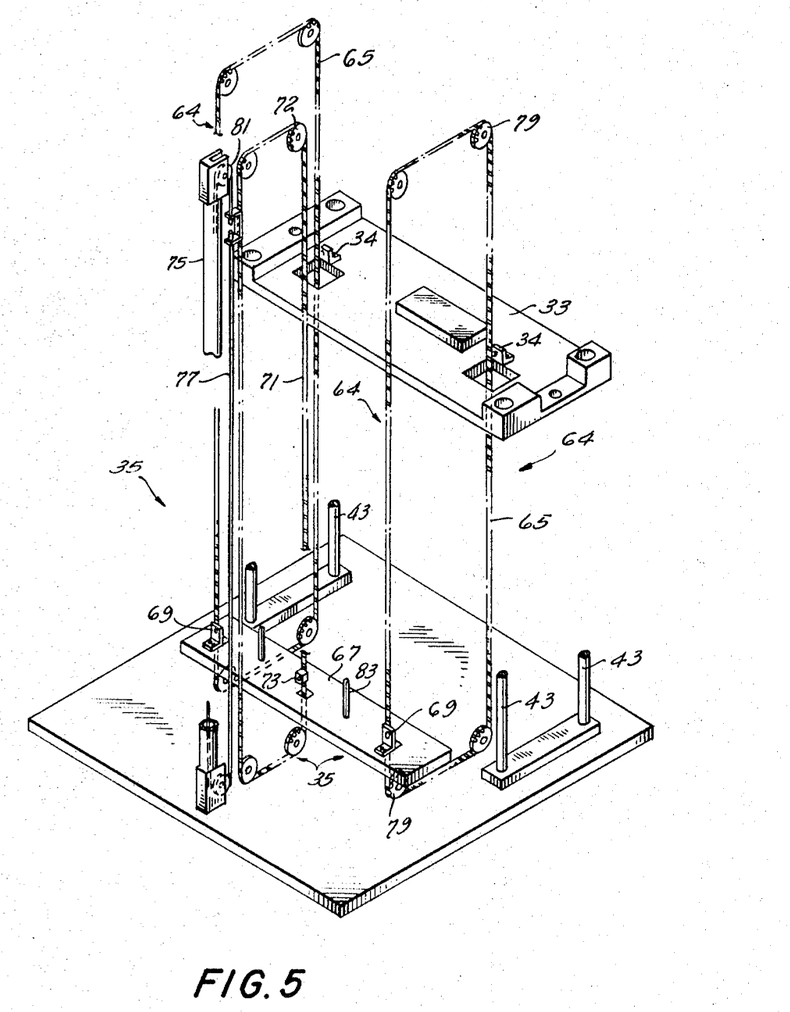
FIG. 5 is a perspective view of the platform and the elevator and counterbalancing arrangement.
Figure 6:
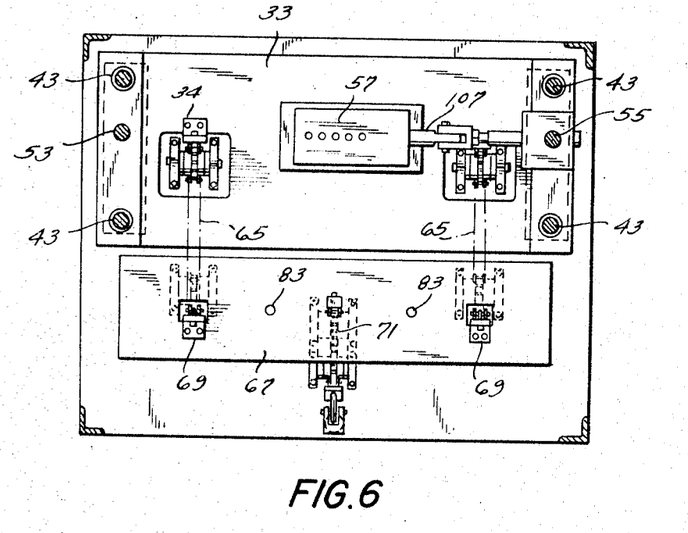
FIG. 6 is a sectional view at 6—6 of FIG. 3.

Movable unit 22 is raised through platform 33 by a sprocket and chain arrangement 64 which is a part of the elevator and counterbalancing arrangement 35 as shown in FIGS. 3 and 5. Two chains 65 are connected to platform 33 through brackets 34 and counterweight 67 through brackets 69. Counterweight 67 is lowered by chain 71 which rides in sprockets 72 and has stop 73 positioned on it to engage the counterweight when the chain is moved downward. Chain 71 is in turn driven by piston and cylinder arrangement 75 which includes belt 77. Chains 65 and 71 are engaged with sprockets 79 and 72, respectively. Belt 77 turns with pulleys 81. Counterweight 67 includes spikes 83 to receive disc weights 85 (FIG. 3) to provide a proper balance between counterweight 67, movable unit 22 and the tension in the sheet.

A position detection unit 14 is connected to one of the shafts supporting sprockets 79 (FIG. 3) for detecting the position of the movable unit. When the movable unit 22 moves up and down sprockets 79 are turned and detection unit 14 operates to speed up or slow down rollers 11. Signals from detection unit 14 to the roller drive unit 12 of rollers 11 cause movable unit 22 to operate around a neutral or null point between the upper and lower positions of travel of the movable unit. As the movable unit 22 moves below the null point unit 14 sends a signal to roller drive unit 12 speeding up the rollers, the signal and therefore the speed change being proportional to the distance the unit has moved below the null point. If the movable unit 22 moves above the null point a signal, also proportional to the distance from the null point, causes the roller drive unit to slow down the speed of rollers 11. It has been found that a ten (10) turn potentiometer, such as Model 625A manufactured by The Clarostat Company of Dover, N.H., functions satisfactorily as position detection unit 14.

Figure 8:
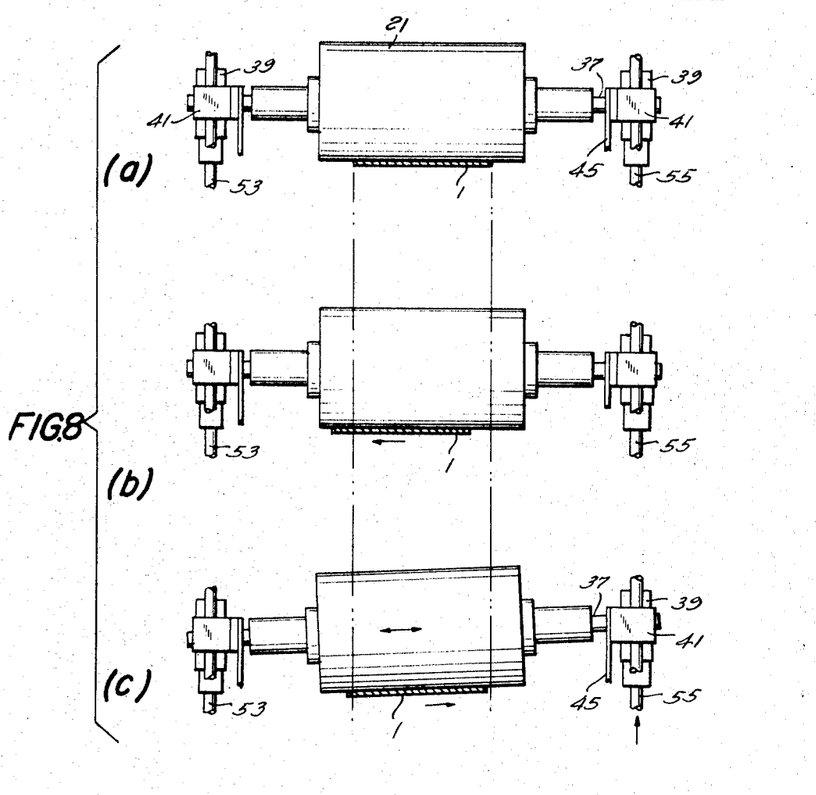

The dancer roll 21 is tilted by vertical movement of control rod 55 (FIG. 4) to cause the moving sheet 1 to move to one side or the other. When the strip has moved to the left as viewed in FIG. 8(b) sensor unit 87 which is part of the tracking system (FIG. 9) detects this movement and through a sensor control unit 88 (FIG. 2) which in turn operates a gas cylinder control unit 57 to raise rod 55 thus tilting shaft 37 and the dancer roll rotatably mounted thereon. This sequence of operation causes strip 1 to move to the right as viewed in FIG. 8(c). After the strip reaches the center region, FIG. 8(a), the dancer roll is automatically returned to its horizontal position. In a similar manner, the strip is guided back to its center position if it moves too far to the right.

Figure 7:
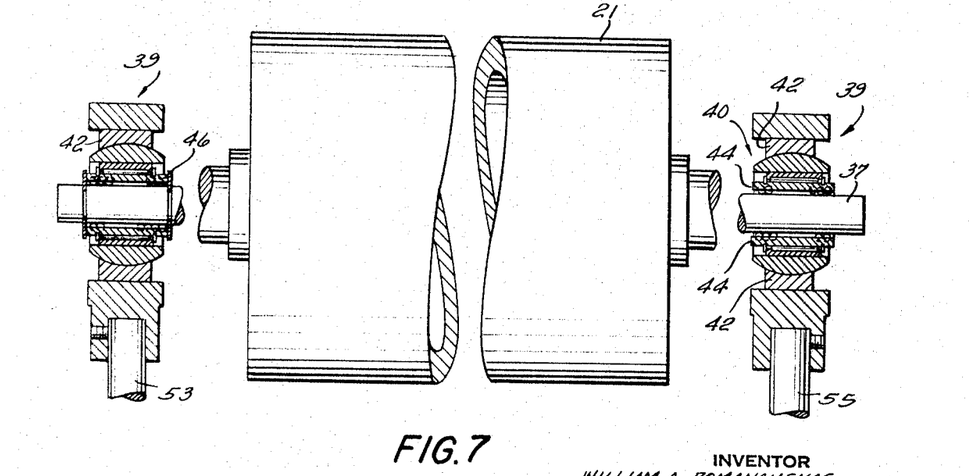
FIG. 7 is a partial sectional elevation view of the dancer roll and its mountings.

In FIG. 7 dancer roll 21 through its shaft 37 is mounted in bearing units 39 which permit tilting of the rotatable dancer roll. Within bearing units 39 are spherical movable bearings which include journal bearing housings 40 positioned for rotation in stationary bearing seats 42. Ball bushings 44 are mounted within housings 40 and snap rings 46 prevent lateral movement of shaft 37. When control rod 55 is raised or lowered, housings 40 turn in bearing seats 42 so that shaft 37 can freely turn in ball bushings 44 without increased friction or binding of the shaft.

Figure 9:
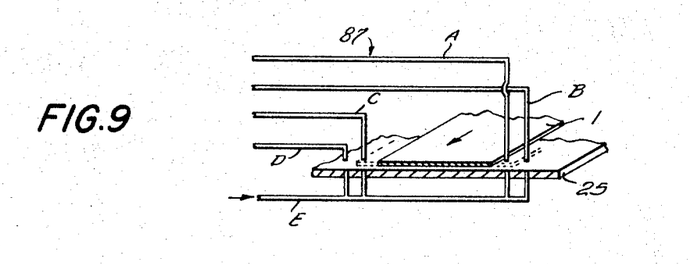
FIG. 9 is a perspective view of the sheet material and the sensor unit of the tracking system.
Figure 10:
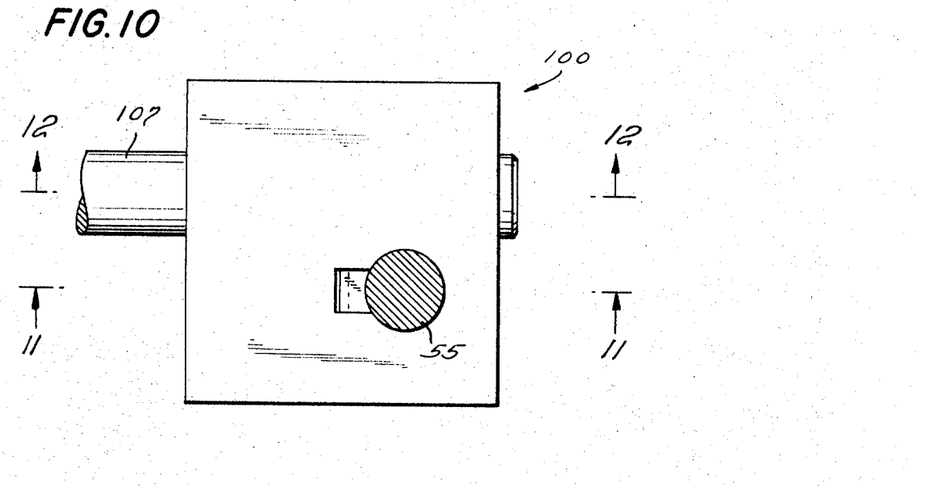
FIG. 10 is a plan view of the transmission unit between the horizontal control piston and the vertical dancer roll control rod.
Figure 11:
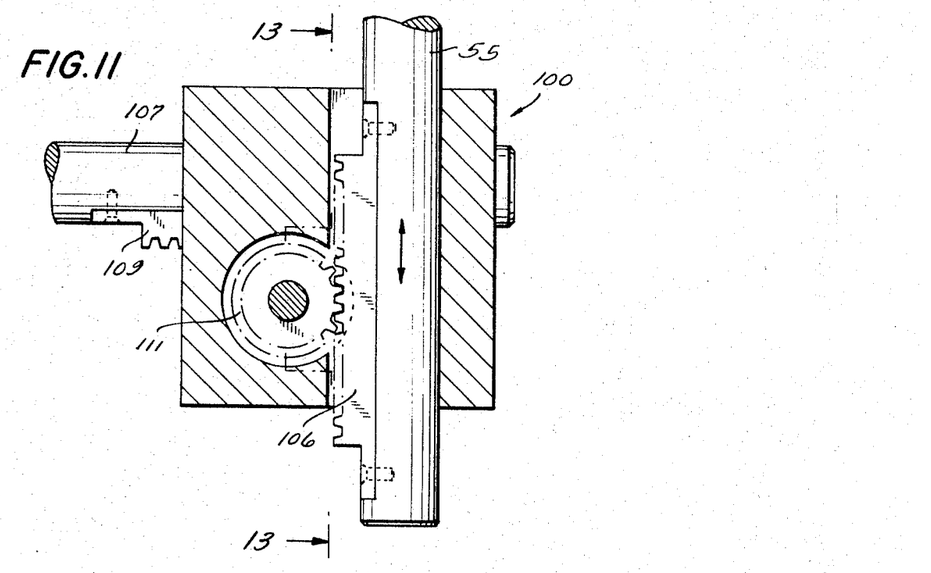
FIG. 11 is a sectional elevation view at 11—11 of FIG. 10.
Figure 12:
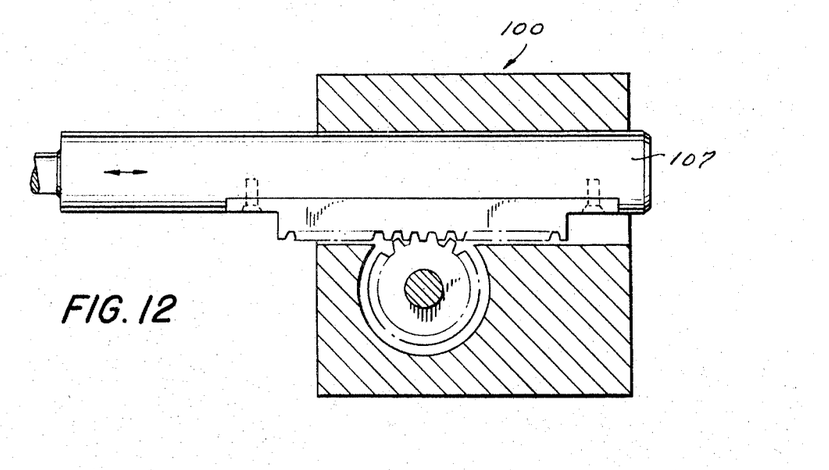
FIG. 12 is a sectional view at 12—12 of FIG. 10.
Figure 13:
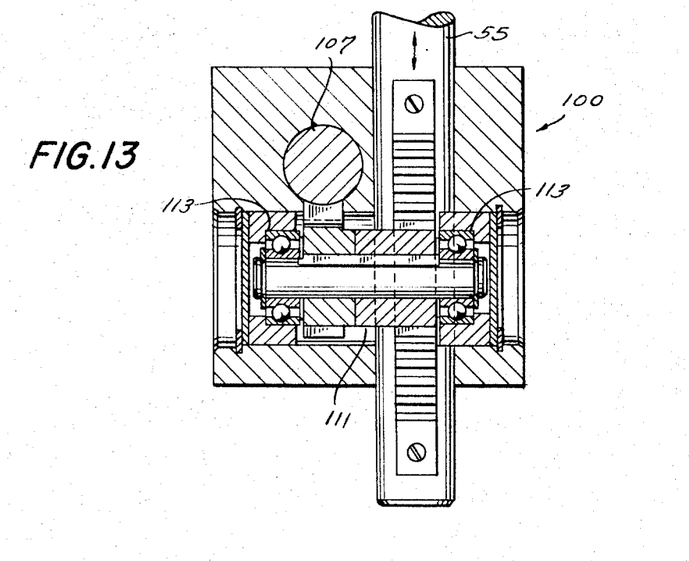
FIG. 13 is a sectional view at 13—13 of FIG. 11.

Turning again to the tracking system and FIG. 9 the sensor unit 87 of the tracking system senses movement of the sheet when the sheet moves to the left or right on supporting plate 25 employing the technique of interrupting the flow of gas between a set of supply and exhaust conduits A–E. Sensors using other techniques such as photocells may be used provided that the sensing means does not distort or otherwise damage the moving sheet 1 which lacks toughness and strength. It is a feature of the present invention that movement of the sheet be sensed and corrected without applying forces to the delicate sheet that might distort or break it. The sensor unit illustrated includes supply line E which has two branches on each side of the sheet terminating at the upper surface of supporting plate 25. Plate 25 is positioned between second turn roll 19 and the rolls 11 in the mill unit (FIG. 1). The sensor unit may be placed at any position with respect to the sheet provided that sheet movement at that point provides an adequate indication of the direction and the amount of lateral movement of the sheet required to operate the tracking system to guide the sheet back to its centered position. The sensor unit uses inert gas since the sheet is moving through an inert atmosphere. Four exhaust gas lines, A, B, C and D, are positioned opposite the supply line branches. The exhaust lines are connected to the sensor control unit 88 (FIG. 1).

In the operation of the sensor unit the displacement of the sheet on plate 25 interrupts the gas flow from supply line E to the exhaust lines causing a pressure reduction in the particular exhaust line or lines covered by the displaced sheet. This pressure reduction operates components including gas valves, amplifiers and solenoids (not shown) within sensor control unit 88 (FIGS. 1 and 2) and gas is thus communicated to control unit 57 through flexible hoses 56 to operate a piston and cylinder arrangement in unit 57. Sensor control unit 88 may operate using any suitable gas such as air. It has been found that a pneumatic logic system for edge guide control made by The Gems Company, Inc. of Farmington, Conn. is suitable as sensor control unit 88.

The piston and cylinder arrangement within control unit 57 operates in response to pressurized and exhausted hoses 56 to move piston 107 to selected positions. The use of position cylinder No. 192758 manufactured by the Westinghouse Air Brake Company serves as a satisfactory cylinder and piston arrangement for this purpose.

In FIGS. 10, 11, 12 and 15 is shown transmission unit 100 between horizontal control piston 107 and vertical control rod 55 in which control piston 107 has gear teeth rack 109 engaging with transfer gear 111. Gear 111 is mounted in bearings 113 and has teeth for engagement with rack 109 and rack 106 of control rod 55 such that reciprocating movement of control piston 107 causes vertical reciprocating movement of control rod 55.

Figure 14:
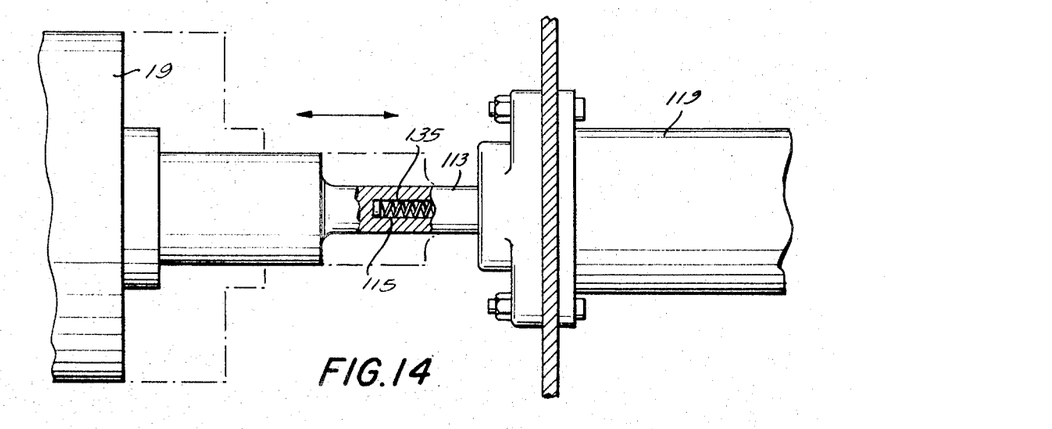
FIG. 14 is an elevation view of the second turn roll and its axially-tensioned mounting arrangement.
Figure 15:
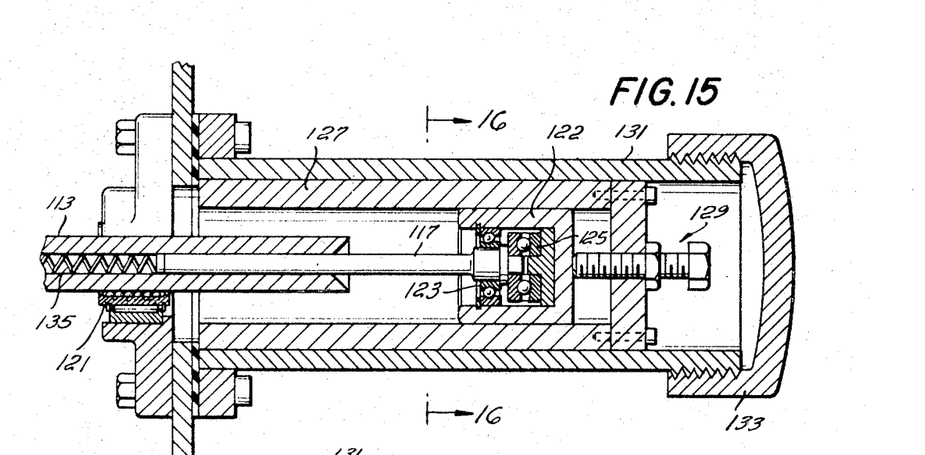
FIG. 15 is a sectional view of an axially-tensioned bearing unit which receives the second turn roll shaft.
Figure 16:
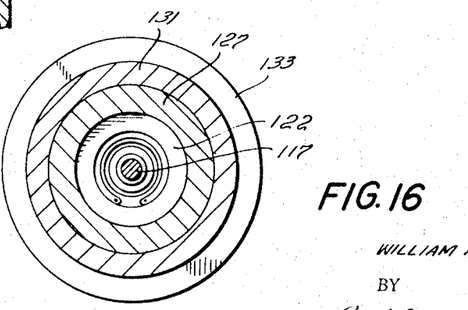
FIG. 16 is a sectional view at 16—16 of FIG. 15.

Turning now to FIGS. 14, 15 and 16, turn roll 19 has partially hollow axle 113 which includes cylindrical chamber 115 for receiving coil spring 135 which holds shaft 117 under tension. Shaft 117 may be keyed to axle 113 to permit only sliding movement between them. Bearing unit 119 includes ball bushing 121, partially shown in FIG. 15, to rotatably support partially hollow axle 113. Ball bushing 121 also permits axial movement of axle 113. Shaft rod 117 is supported in axle 113 and in thrust and journal bearing housing 122 having journal bearing 123 and thrust bearing 125. Bearing housing 122 is positioned in sleeve 127 for adjustment therein by threaded bolt 129. The end of outer housing 131 is covered by atmosphere seal cap 133. The other end of second turn roll 19 may also be spring-centered in its fixed bearing units 119. First turn roll 17 may be similarly mounted.

A roll spring-centered in this manner is held in its centered position by springs 135 when sheet 1 is moving in its centered position. When the sheet moves to the right or left the frictional forces between the sheet and roll cause springs 135 to expand and compress in such a manner that the roll is permitted to move in the direction of sheet movement thereby permitting improved response time between the tilting of the dancer roll and the desired alignment of sheet at the rollers 11.

In the operation of the apparatus, the movable unit 22 is raised to a position such that the foldable bridge 23 including sections 47 is positioned between turn rolls 17 and 19. The forming of sheet 1 is commenced and is fed over first turn roll 17, bridge 23, second turn roll 19, support plate 25 and between rollers 11. Variable speed roller drive unit 12 is energized to drive rollers 11 and the rollers are then adjusted to give the desired degree of compaction of the sintered sheet. Movable unit 22 is raised by operation of elevator and counterbalancing arrangement 35. After the sheet is thus initially threaded and the sheet is continuously moving through the apparatus, movable unit 22 is permitted to be lowered by energizing and raising the piston of cylinder and piston arrangement 75 which permits counterweight 67 to rise and movable unit 22 to lower until the two reach a balanced position. As movable unit 22 moves downward dancer roll 21 engages with the surface of sheet 1 thus forming a loop in the sheet. Counterweight 67 and movable unit 22 are preferably designed to have approximately the same weight so that the tensioning force on the sheet is small since the sintered sheet does not have high tensile strength or toughness. Weights 85 may be used to vary the weight of counterbalance 67.

When sheet 1 moves a sufficient distance to the left or right such that sensor unit senses the movement, dancer roll 21 is tilted and the sheet is urged toward its centered position by the tilting of dancer roll 21 and the action of axially tensioned turn roll 19.

Tension in the sheet is maintained at a selected value by the movable unit and counterweight. Position detection unit 14 detects the vertical position of the movable unit through the elevator and counterbalancing arrangement. When the movable unit moves above the null point the detection unit signals roller drive unit 12 causing the rollers 11 to slow down thus permitting the movable unit to lower. Likewise, if the movable unit reaches below the null point the control unit speeds up the rollers to raise the movable unit. The position control unit thus operates to maintain the movable unit within its effective operating range around the null point.

Although the present invention has been described in conjunction with an embodiment, it is to be understood that modifications and variations may be resorted to without departing from the spirit and scope of the invention as will be readily apparent to those skilled in the art. Such modifications and variations are considered to be within the purview and scope of the invention and appended claims.

I claim:

1. An apparatus for guiding and tensioning a continuously moving sheet comprising:
   a movable unit mounted for reciprocating movement toward and away from the moving sheet, in which the movable unit moves in a plane substantially perpendicular to the path of the moving sheet and having in addition reciprocating means for moving the movable unit toward and away from the sheet and having disengagement means for disengaging the reciprocating means from the movable unit to permit the unit to be freely supported by the moving sheet whereby a selected tension is maintained in the sheet,
   stationary guide means for guiding the movable unit during its reciprocating movement,
   a dancer roll mounted on the movable unit such that initial movement of the unit permits the roll to be moved against a surface of the sheet to apply tension thereto and subsequent movement of the unit permits application of tension to the sheet to be varied,
   tracking means for automatically tracking the moving sheet, and
   tilting means automatically responsive to the tracking means mounted on the movable unit for tilting the dancer roll to vary the application of pressure to the sheet to urge it to move to its normal centered position.

2. The apparatus of claim 1 having in addition a counterweight engageable with the movable unit to urge the unit away from the moving sheet to reduce the tension in the sheet.

3. An apparatus for guiding and tensioning a continuously moving sheet comprising:
   variable drive control device for varying the speed of the sheet,
   a movable unit mounted for reciprocating movement substantially perpendicular to the plane of movement of the sheet,
   stationary guide means for guiding the movable unit during its reciprocating movement,
   a dancer roll positioned on the movable unit for movement into engagement with the sheet to guide and tension the sheet,
   tilting means mounted on the movable unit for tilting the dancer roll to urge the moving sheet to move laterally,
   sensor means for sensing lateral misalignment of the sheet,
   control means responsive to the sensor means for operating said tilting means to urge the sheet to move laterally to correct its misalignment,
   position detection means for detecting the position of the movable unit, and
   said variable drive control device being responsive to the position detection means to increase the speed of the sheet when the movable unit moves to a selected position away from the sheet and decreases the speed of the sheet when the movable unit moves to a selected position near the sheet;
   whereby the moving sheet is guided and tensioned as it moves.

4. The apparatus of claim 3 in which the sheet moves in substantially a horizontal plane and in which the movable unit is movable in a vertical plane having in addition elevator means engageable with the movable unit for initially reciprocating the movable unit whereby the dancer roll is moved against the upper sheet surface and having disengagement means for disengaging the elevator means from the movable unit to permit the movable unit to be freely supported by the moving sheet material whereby a selected tension is maintained in the sheet.

5. An apparatus for controlling a moving sheet comprising:
   variable drive means for varying the speed of movement of the sheet,
   a spring-centered rotatable roll frictionably engaging the moving sheet to support and guide the sheet as it moves,
   mounting means for mounting said rotatable roll, said mounting means in turn comprising a shaft, housing units for receiving and supporting the shaft and at least one spring element between a housing unit and the roll to permit said spring-centered rotatable roll to readily move axially as the sheet moves laterally,
   a movable unit mounted for guided movement toward and away from the moving sheet,
   a tiltable and rotatable dancer roll mounted on the movable unit for rolling engagement with the moving sheet to tension and guide the sheet,
   tilting means mounted on the movable unit for tilting the dancer roll to urge the moving sheet to move laterally,
   sensor means mounted near the moving sheet for sensing lateral misalignment of the sheet,
   control means responsive to the sensor means for operating the tilting means;
   whereby the lateral movement of the moving sheet in one direction will cause the tiltable dancer roll to urge it to readily move in the opposite direction.

6. Apparatus for advancing and maintaining proper tracking of a thin metal strip, comprising:
   a tracking control zone,
   gripping means for gripping the strip at the entrance of said tracking control zone,
   mill rolls for compressing the strip at the discharge of said tracking control zone,
   a tiltable tracking control roll for forming a loop in the strip between said gripping means and mill rolls and for shifting the strip laterally during movement between said gripping means and mill rolls,
   sensing means for sensing the lateral positions of the edges of the strip prior to its movement between the mill rolls, and
   means for controlling the tilting of said tracking control roll in response to said sensing means, to control the lateral alignment of the strip prior to its movement between the mill rolls.

7. Apparatus in accordance with claim 6, including a spring-centered, axially shiftable turn roll that is mounted intermediate the tracking control roll and the mill rolls, and that is readily axially shiftable in response to forces applied thereto by the movement of the strip thereover.

8. Apparatus in accordance with claim 6 wherein said tracking control roll is mounted for floating engagement against one surface of the strip for applying a tension force to the strip, and including means for adjusting the tension force applied by the tracking control roll to the strip.

References Cited

UNITED STATES PATENTS

| | | | |
|---|---|---|---|
| 2,214,618 | 9/1940 | Kenyon et al. | 72—250 |
| 2,348,695 | 5/1944 | Reichert | 72—205 |
| 2,968,936 | 1/1961 | Croset | 64—7 |
| 3,039,513 | 6/1962 | Lasiewicz | 72—205 |
| 2,750,986 | 6/1956 | Russell et al. | 72—16 |
| 3,081,651 | 3/1963 | Roberts | 72—205 |
| 3,175,813 | 3/1965 | Costakis | 72—10 X |
| 3,237,439 | 1/1966 | Torrance | 72—205 |
| 3,318,125 | 5/1967 | Pullen | 72—14 |

CHARLES W. LANHAM, *Primary Examiner.*

A. RUDERMAN, *Assistant Examiner.*

U.S. Cl. X.R.

72—205, 252; 226—22